2,876,124

SPINNING OF VISCOSE

Byron N. Baer, Newark, and John D. Brandner and John W. Le Maistre, Wilmington, Del., assignors to Atlas Powder Company, Wilmington, Del., a corporation of Delaware No Drawing. Application August 22, 1955
Serial No. 529,950

7 Claims. (Cl. 106—165)

This invention relates to the regeneration of cellulose from viscose solutions and more particularly to the manufacture of regenerated cellulose articles such as yarn and film from viscose.

It is an object of the invention to provide a process for producing high-tenacity regenerated cellulose yarn having novel and desirable properties.

Another object of the invention is to provide a process for producing high-tenacity regenerated cellulose yarn.

A further object is to provide a process whereby unripened viscose can be spun to produce a high-tenacity, fatigue resistant regenerated cellulose fiber having improved soil and abrasion resistance.

A still further object is to provide novel viscose compositions adapted to the spinning of high-tenacity regenerated cellulose yarns.

The above and other objects will become more apparent in the course of the following description of the invention and in the appended claims.

The above objects are accomplished in accordance with the invention by incorporating in the viscose solution to be spun a compound which is a polyethylene glycol ether of an amino phenol. The said compound may be represented by the generic formula

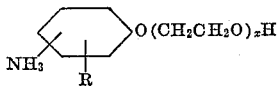

wherein R is hydrogen or an aliphatic hydrocarbon of from 1 to 12 carbon atoms and $x$ is from 2 to 20. An exemplary list of compounds so-defined includes aminophenyl tetraethylene glycol ether, hexaethylene glycol ether of aminocresol, octadecaethylene glycol ether of amino-hexylphenol, eicosaethylene glycol ether of amino-tertiary amylphenol, pentaethylene glycol ether of amino-dodecylphenol.

The defined compounds useful in the practice of the present invention are readily prepared by the addition of ethylene oxide to a phenol followed by nitration and reduction. By way of illustration the preparation of tetraethylene glycol ether of amino-phenol is described in the following example:

Example I

The hydroxyl group of a quantity of the monophenyl ether of tetraethylene glycol was blocked by acetylation in conventional manner. To a mixture of 81 grams (0.26 mol) of the acetylated product and 68.1 grams (0.67 mol) of acetic anhydride was added dropwise a nitrating mixture of 27 grams (0.3 mol) concentrated nitric acid and 68.1 grams (0.67 mol) of acetic anhydride over a 1.75 hour period while keeping the temperature at 12 to 15° C. The reaction mixture was stirred an additional hour at 10° C. and the allowed to stand overnight at room temperature after which it was stripped to terminal conditions at 111° C. and 2.5 mm. Hg. The pot residue amounted to 92.7 grams of the acetate of nitrophenyl ether of tetraethylene glycol.

85 grams of the above pot residue was alcoholized by adding thereto 0.15 gram of a solution of sodium metal in 50 grams of methanol and distilling. After approximately 15 ml. of distillate was collected, the mixture was stripped at reduced pressure and a nearly quantitative yield of nitrophenyl ether of tetraethylene glycol was obtained as pot residue.

Reduction of 70 grams of the above product was carried out in a rocking autoclave using a nickel on kieselguhr (2.7% Ni based on nitro product charged) and an equal volume of absolute ethanol as a diluent. Maximum conditions were 590 p. s. i. g. of $H_2$ at 97° C. for three hours. After filtering off the catalyst and stripping of the solvent at reduced pressure, the aminophenyl ether of tetraethylene glycol was collected as the pot residue and analyzed 4.77% nitrogen.

The defined compounds are soluble in viscose solutions and may be incorporated therein at any stage of the viscose process after the cellulose is dissolved. For effective results, from about 0.5% to about 4.0% by weight of the polyethylene glycol ether of the amino phenol based on the weight of the cellulose in the solution is employed. The composition of the viscose may vary widely as is known in the art. It may be formed from cotton linters or from wood pulp as the source of cellulose and may contain from 4% to 10% of cellulose in a solution containing from 4% to 8% of alkali metal hydroxide. The amount of carbon disulfide used in xanthation may be from 25% to 50%.

The viscose solutions of the invention, i. e., those containing the polyethylene glycol ethers of amino phenols hereinbefore defined, may be employed in the normal manner for the production of regenerated cellulose films and yarns. Suitable spinning or regenerating baths contain sulfuric acid, zinc sulfate and sodium sulfate. Preferred spinning baths contain from 4% to 12% sulfuric acid, from 1% to 10% zinc sulfate and from 13% to 25% sodium sulfate.

The following non-limiting examples illustrate the preparation of viscose solutions and production of regenerated cellulose yarn therefrom, both in accordance with the invention.

Example II

A cotton linters viscose containing 7% cellulose and 6.6% sodium hydroxide is prepared in the conventional manner except that during the dissolution of xanthated cellulose in aqueous sodium hydroxide, 1% by weight based on the cellulose of tetraethylene glycol ether of aminophenol is added and thoroughly dispersed therein. The resultant viscose solution is spun in an unripened state (high salt index of 7) into a bath of 7% sulfuric acid, 8% zinc sulfate and 17% sodium sulfate. The spinning is carried out on conventional equipment to produce regenerated cellulose yarn of high tensile strength resistant to flexing and abrasion of especial benefit as a tire yarn.

Example III

A viscose containing 7% cellulose and 6% sodium hydroxide is modified by the addition of 2% by weight based on the cellulose of octaethylene glycol ether of aminocresol. The modified viscose solution is spun on conventional equipment into a bath of 8% sulfuric acid, 8% zinc sulfate, and 20% sodium sulfate. Yarns of smooth surface and high tensile strength resistant to soiling result.

Example IV

A wood pulp viscose containing 7% cellulose and 6.6% sodium hydroxide is prepared in the conventional manner except that 1% by weight based on the cellulose of octadecaethylene glycol ether of amino-nonylphenol is incorporated therein during the dissolution of the xanthate in alkali solution. Using conventional spinning equipment the not fully ripened viscose is coagulated and regenerated by spinning into a bath containing 8% sulfuric acid, 8% zinc sulfate, and 20% sodium sulfate. The regenerated purified cellulose filaments are cut to give a strong, abrasion resistant, soil resistant staple suitable for carpets.

In the illustrative examples, tetraethylene glycol ether of aminophenol, octaethylene glycol ether of aminocresol, and octadecaethylene glycol ether of amino-nonylphenol have been employed as the viscose modifying agents. Similar improved results may be obtained by employing any of the polyethylene glycol ethers of amino phenols as defined hereinbefore.

What is claimed is:

1. Viscose containing from 0.5% to 4.0%, based on the cellulose content of the viscose, of a compound conforming to the generic formula

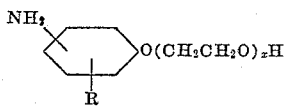

wherein R is a member selected from the group consisting of hydrogen and aliphatic hydrocarbon radicals of from 1 to 12 carbon atoms and $x$ has any value from 2 to 20.

2. Viscose containing from 0.5% to 4.0%, based on the cellulose content of the viscose, of a polyethylene glycol ether of an amino phenol, said ether containing from 2 to 20 oxyethylene groups.

3. Viscose containing from 0.5% to 4.0%, based on cellulose content of the viscose, of tetraethylene glycol ether of aminophenol.

4. Viscose containing from 0.5% to 4.0%, based on the cellulose content of the viscose, of octadecaethylene glycol ether of amino-nonylphenol.

5. Viscose containing from 0.5% to 4.0%, based on the cellulose content of the viscose, of octaethylene glycol ether of aminocresol.

6. A viscose spinning solution comprising from 4.0% to 10.0% cellulose, from 4.0% to 8.0% alkali metal hdroxide and from 0.5% to 4.0% based on the weight of the cellulose, of a compound conforming to the generic formula

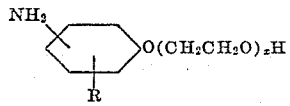

wherein R is a member selected from the group of hydrogen and aliphatic hydrocarbon radicals containing from 1 to 12 carbon atoms and $x$ has any value from 2 to 20.

7. In the spinning of regenerated cellulosic yarns from viscose, the improvement which comprises dissolving in the viscose solution from 0.5% to 4.0%, based on its cellulose content of a compound conforming to the generic formula

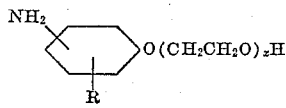

wherein R is a member selected from the group consisting of hydrogen and aliphatic hydrocarbon radicals containing from 1 to 12 carbon atoms and $x$ has any value from 2 to 20.

References Cited in the file of this patent

UNITED STATES PATENTS

| | | |
|---|---|---|
| 2,451,558 | Schlosser | Oct. 19, 1948 |
| 2,593,466 | MacLaurin | Apr. 22, 1952 |
| 2,732,279 | Tachikawa | Jan. 24, 1956 |
| 2,775,505 | Pedlow | Dec. 25, 1956 |
| 2,777,775 | Edwards | Jan. 15, 1957 |

UNITED STATES PATENT OFFICE

Certificate of Correction

Patent No. 2,876,124 — March 3, 1959

Byron N. Baer et al.

It is hereby certified that error appears in the printed specification of the above numbered patent requiring correction and that the said Letters Patent should read as corrected below.

Column 1, lines 39 to 42, the formula should appear as shown below instead of as in the patent:

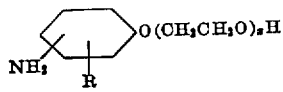

same column 1, line 70, for "the allowed" read —then allowed—; column 4, line 6, for "hdroxide" read —hydroxide—.

Signed and sealed this 11th day of August 1959.

[SEAL]

Attest:
KARL H. AXLINE,
*Attesting Officer.*

ROBERT C. WATSON,
*Commissioner of Patents.*